Apr. 24, 1923.                                                    1,452,574
J. SLEPIAN
CIRCUIT INTERRUPTER
Filed June 29, 1918

WITNESSES:
H. B. Funk
J. H. Procter

INVENTOR
Joseph Slepian.
BY
Wesley G. Carr
ATTORNEY

Patented Apr. 24, 1923.

1,452,574

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

CIRCUIT INTERRUPTER.

Application filed June 29, 1918. Serial No. 242,625.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Circuit Interrupters, of which the following is a specification.

My invention relates to circuit interrupters and particularly to means for limiting the current transversing the same before the circuit is completely opened.

One object of my invention is to provide a member that is saturated with an electrolyte which is adapted to evaporate when current traverses the same to change the resistance of the member.

Another object of my invention is to provide a device of the above-indicated character that shall be adapted for use in connection with resistance-type circuit interrupters for dissipating the energy of the circuit before final interruption thereof.

Another object of my invention is to provide a device of the above-indicated character that shall be adapted for high-voltage circuits.

A further object of my invention is to provide a current-limiting device that shall be simple and inexpensive to construct and that shall be inherently resetting in its operation.

In practicing my invention, I provide a cloth or fiber member that is electrically connected across the terminals of the auxiliary contact members of a circuit interrupter. One portion of the cloth member is disposed in a solution of deliquescent salt, such as calcium bichloride, that is adapted to saturate the cloth member by capillary action. When the auxiliary contact members are separated, current traverses the cloth member and thereby evaporates the salt solution to thus increase the resistance of the device and, in this manner, so limit the current that the main contact members may be separated without injury to the same.

Figure 1:
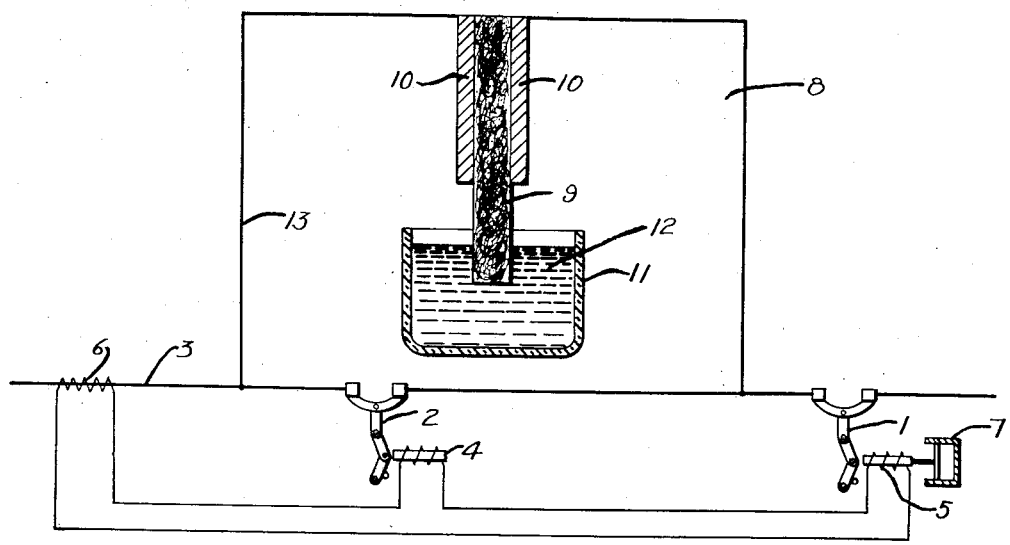
Figure 2:
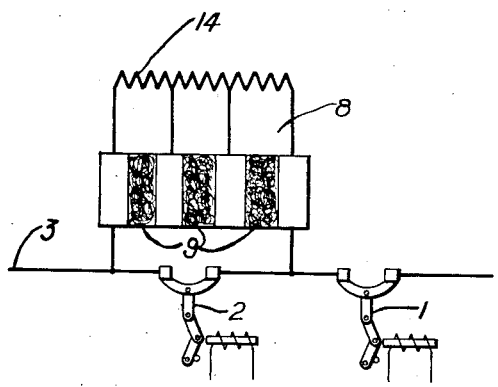
Figure 3:
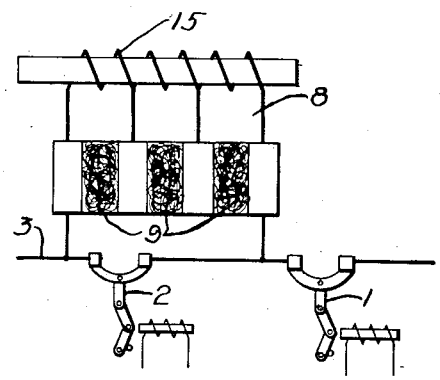
Figure 4:
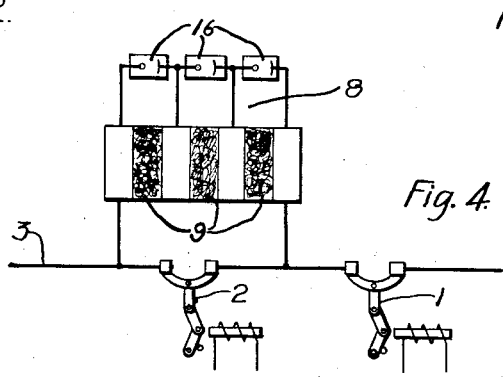

Figure 1 of the accompanying drawings is a diagrammatic view of a circuit interrupter embodying my invention. Figs. 2, 3 and 4 are diagrammatic views of modifications of my invention, as applied to high-voltage circuit interrupters.

A circuit interrupter system, as shown in Fig. 1, comprises a main circuit interrupter 1 and an auxiliary circuit interrupter 2 that are connected in series with the circuit 3 to be protected. The trip coil 4 of the circuit interrupter 2 is operatively connected in series with the trip coil 5 of the circuit interrupter 1, and the circuit, thus constituted is connected to a series transformer winding 6. The trip coil 5 of the circuit interrupter 1 is provided with a dash pot 7, or other suitable time-element device to retard the operation of the same a predetermined interval of time.

A current-limiting device 8 is connected in shunt relation to the circuit interrupter 2 for the purpose of receiving the current traversing the circuit 3 when the circuit interrupter 2 is open and for so reducing the current as to permit the circuit interrupter 1, when the same is tripped, to be required to interrupt only a relatively small current. The device 8 comprises a cloth or other fibrous member 9 that is disposed between conducting terminals 10. The member 9 extends into a receptacle 11 that contains a deliquescent salt solution 12, such as calcium bichloride. The member 9 is adapted to become saturated with the salt solution by capillary action and thus constitutes a conducting member, under normal conditions.

When an overload traverses the circuit 3, the trip coil 4 will operate to trip the circuit interrupter 2. This will permit the current to traverse the circuit 13 of the device 8 and, when current traverses the member 9, sufficient heat will be liberated to evaporate the salt solution therein and thus increase the resistance to the flow of current therethrough. After sufficient current has traversed the device 8 to reduce the current to a relatively small value, the dash pot 7 will permit the circuit interrupter 1 to be tripped and thereby completely open the circuit 3.

It will be understood that my invention is not limited to the particular form of tripping device illustrated, as it is merely necessary that the circuit interrupter 1 be tripped a sufficient interval of time after the circuit interrupter 2 is tripped to permit the device 8 to function properly.

If my device is to be used in high-voltage circuits, it may be necessary to provide a plurality of members 9, as shown in Figs. 2, 3 and 4 of the drawings. However, if the resistances of the members 9 do not increase at the same rate, one of these members may be subjected to a higher voltage than the others, whereby internal arcing may be produced. In order to avoid such arcing, I provide resistors 14, as shown in Fig. 2, to equalize the voltages impressed upon the members 9. A like result may be obtained by the use of reactors 15, as shown in Fig. 3 of the drawing, and also by the use of valve cells 16, as shown in Fig. 4, that polarize only up to a definite voltage and thus limit the potential difference in each of the members 9.

The operation of the modification shown in each of Figs. 2, 3 and 4 is similar to that of the apparatus shown in Fig. 1. That is, when an overload traverses the circuit 3, the interrupter 2 will be tripped, and the current will be so limited in the device 8 that, when the interrupter 1 is opened after a predetermined interval of time, only a relatively small current need be interrupted.

My invention is not limited to the particular structures illustrated, as it may be variously modified without departing from the spirit and scope of the invention, as set forth in the appended claims.

I claim as my invention:

1. A current-limiting device comprising two spaced conductor members, a vessel containing a body of conducting fluid, and a member interposed between the conductor members and having one of its portions extending into the fluid, the said interposed member being of fluid-absorbing material.

2. A current-limiting device comprising a capillary member impregnated with a conducting fluid that evaporates when current has traversed the said member for an appreciable length of time and means for automatically replacing the fluid that has been evaporated.

3. A current-limiting device comprising a non-conducting porous member containing a conducting fluid that becomes inoperative as a conductor after current has been directed through the said member for an appreciable length of time, and means for automatically restoring the conducting function of the device after each interruption of current therethrough.

4. A current-limiting device comprising a pair of conducting members, a fibrous member interposed between the conducting members, and means for introducing a vaporizable conducting liquid into the fibrous member and for automatically replacing the vaporized liquid.

5. A current-limiting device comprising a plurality of conductors, a conducting medium interposed between the conductors and subject to reduction in volume as current flows therethrough, and means for automatically restoring the said medium to its original volume upon the reduction of current flow to a predetermined value.

6. A current limiting device comprising a pair of spaced terminal members, a plurality of spaced capillary members interposed therebetween, and conductor members bridging the spaces between the capillary members, the capillary members being saturated with a salt solution that is adapted to evaporate when current traverses the member, to thereby increase the resistance thereof to the passage of current.

7. A current limiting device comprising a plurality of spaced porous wick members, means for bridging the spaces between adjacent members, and means for saturating the wick members with a salt solution that is adapted to evaporate when current traverses the same, to thereby increase the resistance thereof.

8. A current limiting device comprising a plurality of porous normally non-conducting spaced members, means for bridging the spaces between adjacent porous members, means for supplying a salt solution to the porous members and means for causing current to traverse the said members to evaporate the solution contained therein and thereby increase the resistance of said members.

9. A current limiting device comprising a plurality of spaced fibrous members, means for bridging the space between such members, a solution of calcium bichloride adapted to saturate the fibrous members by capillary attraction and means for causing current to traverse the porous members to vaporize the calcium bichloride solution and thereby increase the resistance offered to the flow of current therethrough.

10. A current limiting device comprising a salt solution, a pair of spaced fibrous members saturated by the solution, a bridging member for the fibrous members and means for causing current to traverse the said bridging and fibrous members.

In testimony whereof, I have hereunto subscribed my name this 22nd day of June 1918.

JOSEPH SLEPIAN.